United States Patent
Ren et al.

(10) Patent No.: US 11,470,792 B2
(45) Date of Patent: Oct. 18, 2022

(54) **METHOD OF CULTURING *STICHOPUS JAPONICUS, MARSUPENAEUS JAPONICUS, PORTUNUS TRITUBERCULATUS* AND *ULVA LACTUCA***

(71) Applicant: Yellow Sea Fisheries Research Institute, Chinese Academy of Fishery Sciences, Shandong (CN)

(72) Inventors: Xianyun Ren, Shandong (CN); Baoquan Gao, Shandong (CN); Zhiqiang Chang, Shandong (CN); Hongxing Ge, Shandong (CN); Qingbing Liu, Shandong (CN); Ping Liu, Shandong (CN); Jian Li, Shandong (CN); Ruiyong Fan, Shandong (CN)

(73) Assignee: Yellow Sea Fisheries Research Institute, Chinese Academy of Fishery Sciences, Qingdao (CN)

( * ) Notice: Subject to any disclaimer, the term of this patent is extended or adjusted under 35 U.S.C. 154(b) by 0 days.

(21) Appl. No.: 17/705,272

(22) Filed: Mar. 25, 2022

(65) Prior Publication Data

US 2022/0240466 A1   Aug. 4, 2022

Related U.S. Application Data

(63) Continuation of application No. PCT/CN2021/079900, filed on Mar. 10, 2021.

(30) Foreign Application Priority Data

Dec. 9, 2020 (CN) .......................... 202011445393.9

(51) Int. Cl.
*A01K 61/00* (2017.01)
*A01G 33/00* (2006.01)
*A01K 61/30* (2017.01)
*A01K 61/59* (2017.01)

(52) U.S. Cl.
CPC .............. *A01G 33/00* (2013.01); *A01K 61/30* (2017.01); *A01K 61/59* (2017.01)

(58) Field of Classification Search
CPC ......... A01K 61/30; A01K 61/59; A01G 33/00
See application file for complete search history.

(56) References Cited

FOREIGN PATENT DOCUMENTS

| CN | 101743920 A | | 6/2010 | | |
|---|---|---|---|---|---|
| CN | 102823531 A | * | 12/2012 | | |
| CN | 104108796 A | | 10/2014 | | |
| CN | 104304107 A | * | 1/2015 | ............ | A01K 61/59 |
| CN | 104920260 A | * | 9/2015 | ............ | A01K 61/59 |
| CN | 107006410 A | * | 8/2017 | | |
| CN | 107232105 A | * | 10/2017 | ............ | A01K 61/59 |
| CN | 107361001 A | * | 11/2017 | | |
| CN | 105284692 B | * | 8/2018 | | |
| CN | 109076995 A | * | 12/2018 | | |
| CN | 106259121 B | * | 1/2019 | | |
| CN | 109197705 A | | 1/2019 | | |
| CN | 105918168 B | * | 2/2019 | | |
| CN | 109619000 A | * | 4/2019 | ............ | A01K 61/59 |
| CN | 109644912 A | * | 4/2019 | ............ | A01K 61/13 |
| CN | 109744171 A | * | 5/2019 | | |
| CN | 109804953 A | * | 5/2019 | | |
| CN | 110338113 A | * | 10/2019 | | |
| FR | 2994428 A1 | * | 2/2014 | ............ | A01G 33/00 |
| KR | 20080013713 A | * | 2/2008 | | |
| KR | 20110068046 A | * | 6/2011 | | |
| KR | 20130042803 A | * | 4/2013 | | |

OTHER PUBLICATIONS

CN 101743920 A, machine translation (Year: 2010).*
CN 104108796 A (Year: 2014).*
CN 109197705 A (Year: 2019).*

* cited by examiner

*Primary Examiner* — Son T Nguyen

(57) ABSTRACT

Provided is a method of culturing *Stichopus japonicus Stichopus japonicus, Marsupenaeus japonicus, Portunus trituberculatus* and *Ulva lactuca*, which belongs to the technical field of mariculture, including the following steps: preparing a pond and laying a substratum for *Stichopus japonicus* from March 1 to 5; putting the *Stichopus japonicus* seedlings, and then culturing *Ulva lactuca* seedlings on April 1; putting *Marsupenaeus japonicus* seedlings on April 15; putting *Portunus trituberculatus* juveniles on May 5; harvesting *Marsupenaeus japonicus* on July 15, and putting *Marsupenaeus japonicus* seedlings again; harvesting *Stichopus japonicus, Marsupenaeus japonicus, Portunus trituberculatus* and *Ulva lactuca* from November 5 to 10. By adopting the method of biological control of predators of *Stichopus japonicus*, the use of the pesticides and fishery drugs in the culture and pond-cleaning process is reduced, and green and healthy culture, energy saving and environmental protection are realized.

4 Claims, No Drawings

METHOD OF CULTURING STICHOPUS JAPONICUS, MARSUPENAEUS JAPONICUS, PORTUNUS TRITUBERCULATUS AND ULVA LACTUCA

CROSS REFERENCE TO RELATED APPLICATION

The present application is a continuation application of PCT application No. PCT/CN2021/079900 filed on Mar. 10, 2021, which claims the benefit of Chinese Patent Application No. 202011445393.9 filed on Dec. 9, 2020. The contents of the above applications are incorporated herein by reference in their entirety.

TECHNICAL FIELD

The present invention relates to the technical field of mariculture, and more particularly to a method of culturing *Stichopus japonicus*, *Marsupenaeus japonicus*, *Portunus trituberculatus* and *Ulva lactuca*.

BACKGROUND ART

*Stichopus japonicus* is a marine temperate species. In recent years, with the improvement of people's living standards and the increasing health awareness and the effective expansion of the consumer market of *Stichopus japonicus*, the *Stichopus japonicus* culture industry is greatly stimulated and has become a pillar industry of the fishery economy in Shandong and Liaoning provinces. With the expansion of aquaculture scale, the sea cucumber industry is facing two main problems: firstly, since 2013, the extreme summer heat and extreme weather in Northern China has greatly affected the culture industry of *Stichopus japonicus*, and the bottom temperature of the pond during the high temperature period can reach 33 to 34° C., which exceeds the temperature tolerance limit of *Stichopus japonicus*, and there is a heavy loss for the culture of *Stichopus japonicus* in ponds. How to help sea cucumbers to survive the summer has become a bottleneck restricting the development of the industry; secondly, the pond substrates for culturing *Stichopus japonicus* ponds are aging and the pond ecological balance is seriously unbalanced. Predators of *Stichopus japonicus* (e.g. *Corophium* sp., *turritella*, etc.) reproduce in large numbers, which rob the natural foods and living space, so the production of *Stichopus japonicus* is greatly reduced; moreover, the culture of *Stichopus japonicus* uses a large amount of pesticides such as dichlorvos to kill predators, which will pollute the environment and cause serious problems of food safety.

*Marsupenaeus japonicus* belongs to Decapoda, Penaeidae, *Marsupenaeus* ... *Marsupenaeus japonicus* grows fast, is resistant to dry dew, has bright color and high economic value, so it is favored in the aquatic product markets and by farmers. *Marsupenaeus japonicus* is cultured in coastal provinces and cities from Southern China to Northern China, forming a scale. Presently, *Marsupenaeus japonicus* is mainly monocultured in ponds, with a low output, which is difficult to meet the current market demand. Therefore, it is necessary to change the status quo with a new pond culture mode.

*Portunus trituberculatus* is an important marine economic animal. Due to its fast growth, large size, and delicious meat, it is loved by the people and has high economic value. Therefore, the culture of *Portunus trituberculatus* is gradually expanding. In 2006, the culture area reached 634,500 mu in China (2007 China Fishery Statistics Yearbook). However, in recent years, due to the vigorous development of the culture of *Stichopus japonicus*, a large number of aquaculture ponds of *Portunus* crabs have been changed to culture *Stichopus japonicus*, so the culture area of *Portunus trituberculatus* is shrinking year by year. In 2019, the culture area was only 326,100 mu in China (China Fishery Statistics Yearbook 2020), decreased by nearly 40%. Due to the destruction of the culture environment, the output is reduced sharply.

In recent years, due to the single mode of offshore aquaculture, the aquaculture space cannot be used comprehensively. In the sea areas dominated by cultured animals such as *Stichopus japonicus*, *Portunus trituberculatus*, *Marsupenaeus japonicus*, a large amount of organic matters such as bait and manure are deposited, causing the increased organic matters in the sea areas and eutrophication of ponds. For this reason, exploring an ecological, high-efficiency, and low-carbon aquaculture method through the reasonable combination of aquaculture organisms has become a good measure to achieve the sustainable development of the seawater marine industry featured by "high efficiency, high quality, ecology, health and safety".

SUMMARY

In order to solve the above technical problems in the prior art, the present invention provides a method of culturing *Stichopus japonicus*, *Marsupenaeus japonicus*, *Portunus trituberculatus* and *Ulva lactuca*, to make full use of the sea water layer to improve the eological and economic benefits for the culture of *Stichopus japonicus*, *Marsupenaeus japonicus*, *Portunus trituberculatus* and *Ulva lactuca*.

In order to achieve the above object, the present invention provides the following technical solutions:

A method of culturing *Stichopus japonicus*, *Marsupenaeus japonicus*, *Portunus trituberculatus* and *Ulva lactuca*, comprising the following steps:
(1) preparing a pond and laying a substratum for *Stichopus japonicus* from March 1 to 5;
(2) putting the *Stichopus japonicus* seedlings, and then culturing *Ulva lactuca* seedlings on April 1;
(3) putting *Marsupenaeus japonicus* seedlings on April 15;
(4) putting *Portunus trituberculatus* juveniles on May 5;
(5) harvesting *Marsupenaeus japonicus* in on July 15, and putting *Marsupenaeus japonicus* seedlings again;
(6) harvesting *Stichopus japonicus*, *Marsupenaeus japonicus*, *Portunus trituberculatus* and *Ulva lactuca* from November 5 to 10.

Further, in the step (2), the stocking density of *Stichopus japonicus* is 4000 to 6000/mu, and the size of the *Stichopus japonicus* seedlings is 500 to 800/kg.

Further, in the step (2), the fresh weight density of the *Ulva lactuca* seedlings is 0.3 to 2.0 kg/m$^3$.

Further, in the step (3) and step (5), the stocking density of *Marsupenaeus japonicus* seedlings is 1000 to 1200 seedlings/mu, and all of *Marsupenaeus japonicus* seedlings are p10 post-larval seedlings.

Further, in the step (4), the stocking density of *Portunus trituberculatus* juveniles is 150-200 crabs/mu.

Further, the *Portunus trituberculatus* juveniles are stage II juveniles.

Further, the *Ulva lactuca* seedlings in step (2) are cultured by raft culture.

Further, each net curtain of the raft culture is 20 to 24 m², 8-10 net curtains per mu of water, and 0.3 to 2.0 kg of *Ulva lactuca* seedlings are cultured on each net curtain.

Compared with the prior art, the present invention has the beneficial effects as follows.

(1) The present invention is based on the biological characteristics of *Stichopus japonicus* and shrimps and crabs in the growth time and nutritional level. *Marsupenaeus japonicus* and *Portunus trituberculatus* that grow fast and have high economic value are selected to make full use of "free" water bodies of the ponds and abundant natural bait in the ponds during the "summer dormancy" period of *Stichopus japonicus* for polyculture of sea cucumber, shrimps, crabs and algae, with the advantages of effectively using water space and reducing the production cost and increasing the aquaculture output, etc.;

(2) The present invention determines the stocking density of *Portunus trituberculatus* and *Marsupenaeus japonicus* in the *Stichopus japonicus* aquaculture ponds, to achieve the optimal economic benefits;

(3) By polyculture of *Stichopus japonicus* with *Marsupenaeus japonicus* and *Portunus trituberculatus*, *Marsupenaeus japonicus* and *Portunus trituberculatus* can ingest predators of *Stichopus japonicus*, such as *turritella* and *Corophium* sp. as their feeds, to enhance the output of the *Stichopus japonicus*; and meanwhile, *Portunus trituberculatus* can ingest *Marsupenaeus japonicus* with illness and poor vitality, to effectively prevent and control the disease of *Marsupenaeus japonicus*;

(4) In the present invention, *Ulva lactuca* is cultured by constructing a net curtain on the water surface of a pond, and the constructed net curtain can help *Stichopus japonicus* to shade and spend the summer safely;

(5) By introducing *Ulva lactuca* into the culture environment, *Ulva lactuca* can absorb the nutrients and $CO_2$ released by the cultured animals into the water body, and produce oxygen, adjust the pH value and dissolved oxygen value of the water body; moreover, *Ulva lactuca* can absorb the nitrogen, phosphorus, sulfide and other substances in the water to achieve ecological regulation and bioremediation of the culture environment; in addition, *Ulva lactuca* with economic value can be harvested 5 to 8 times a year, which improves economic benefits and combines the ecological benefits, economic benefits and social benefits;

(6) The present invention adopts the method of biological control of predators of *Stichopus japonicus*, which reduces the use of the pesticides and fishery drugs in the culture and pond-cleaning process and achieves green and healthy culture, energy saving and environmental protection.

DETAILED DESCRIPTION

Various exemplary embodiments of the present invention will be described in detail. The detailed description should not be considered as a limitation to the present invention, but should be understood as a more detailed description of some aspects, characteristics and embodiments of the present invention. It should be understood that the terms used herein are only used to describe specific embodiments and are not used to limit the present invention.

Furthermore, the numerical range in the present invention should be understood that all values between the upper limit and the lower limit of the range are specifically disclosed. Each smaller range between any stated value or intermediate value within the stated range and any other stated value or intermediate value within the stated range is also included in the present invention. The upper and lower limits of these smaller ranges can be independently included in or excluded from the range.

Unless otherwise stated, all technical and scientific terms used herein have the same meaning as commonly understood by those skilled in the art. Although only preferred methods and materials are described in the present invention, any methods and materials similar or equivalent to those described herein can also be used in the embodiments or tests of the present invention. All references mentioned in the Specification are incorporated by reference to disclose and describe methods and/or materials related to the references. In the event of conflict with any incorporated references, it should be subjected to the content in the Specification.

Various improvements and changes can be made to the specific embodiments of the present invention without departing from the scope or spirit of the present invention, which is obvious to those skilled in the art. Other embodiments derived from the Specification of the present invention will be obvious to technicians skilled in the art. The Specification and examples are only exemplary in the present invention.

EXAMPLE 1

On Mar. 5, 2018, a pond was prepared, and five aquaculture ponds were set, 60 mu each, and a substratum for *Stichopus japonicus* was laid. On Apr. 1, 2018, *Stichopus japonicus* seedlings with a size of 500/kg was put, with a stocking density of 6,000/mu. On April 15, in the experimental groups, the second p10 post-larval seedlings of *Marsupenaeus japonicus* were put in a stocking density of 600, 800, 1000 and 1200 seedlings/mu; and in the control group, seedlings of *Marsupenaeus japonicus* were put in a stocking density of 1500 seedlings/mu. On Jul. 20, 2018, *Marsupenaeus japonicus* was cultured for 80 days and the size of *Marsupenaeus japonicus* in the ponds in the experimental groups reached 35-40/catty, while the size in the pond in the control group reached 50-55/catty. According to the economical benefits, the optimal stocking density of the *Marsupenaeus japonicus* was 1000 to 1200 seedlings/mu.

TABLE 1

Output of *Marsupenaeus japonicus* under different stocking densities

| | Stocking density (seedlings/mu) | | | | |
|---|---|---|---|---|---|
| | Control group (1500) | 600 | 800 | 1000 | 1200 |
| Output (kg) | 1020 | 615 | 862 | 943 | 1108 |
| Mean body weight (g) | 8.9 ± 0.8 | 13.6 ± 1.2 | 12.6 ± 0.9 | 12.8 ± 0.9 | 12.4 |
| Benefits (ten thousand yuan) | 3.2 | 2.8 | 4.6 | 5.6 | 5.8 |

After *Marsupenaeus japonicus* were put into ponds for 15 days, stage II *Portunus trituberculatus* juveniles were put according to the stocking density of 50, 75, 100 and 200 seedlings/mu in the experimental groups, while 300 seedlings/mu in the control group. Since November, *Portunus* crabs were harvested, and the output in the experimental group with the density of 200 seedlings/mu was highest, which was 1062 kg, with average size of 354 g each. Although the output of the control group was the highest, the mean body weight was 286 g each. According to the economical benefits analysis, the optimal density of *Portunus trituberculatus* was 200 per mu, with the highest benefits. Therefore, the optimal stocking density was 150-200 *Portunus trituberculatus* per mu in the *Stichopus japonicus* aquaculture ponds.

TABLE 2

Output of *Portunus trituberculatus* under different stocking densities

| | Stocking density (seedlings/mu) | | | | |
|---|---|---|---|---|---|
| | Control group (300) | 50 | 100 | 150 | 200 |
| Output (kg) | 1860.3 | 578.6 | 945.6 | 972 | 1062 |
| Mean body weight (g) | 286 ± 26 | 378.6 ± 32.8 | 362.9 ± 22.8 | 362.9 ± 10.8 | 354.2 ± 10.8 |
| Benefits (ten thousand yuan) | 5.3 | 3.8 | 4.7 | 5.4 | 5.6 |

Thus, it could be concluded that, in aquaculture ponds with a stocking density of 6000 *Stichopus japonicus*/mu, the optimal density of *Marsupenaeus japonicus* is 1000 to 1200 seedlings/mu, and the optimal density of *Portunus trituberculatus* is 150 to 200/mu.

EXAMPLE 2

A polyculture of *Stichopus japonicus-Marsupenaeus japonicus-Portunus trituberculatus-Ulva lactuca* is carried out in the Huangdao area of Qingdao. The aquaculture area of the pond is 60 mu. The steps are as follows:

(1) prepare a pond and laying a substratum for *Stichopus japonicus* from March 1 to 5;
(2) put the *Stichopus japonicus* seedlings with a size of 500/kg and a density of 6,000/mu and on April 1, feed them normally;
(3) After stocking *Stichopus japonicus* seedlings, set up net curtains, wherein each curtain is 24 m², and the fresh weight density of each net curtain is 0.3 kg/m², and for *Ulva lactuca* seedlings with a length of 1 cm, 10 net curtains are set up per mu of water;
(4) put p10 post-larval seedlings of *Marsupenaeus japonicus* according to 1200 seedlings/mu on April 15;
(5) put stage II *Portunus trituberculatus* juveniles according to 150 crabs per mu on May 5;
(6) harvest *Marsupenaeus japonicus* and send to the markets on July 15, and put second p10 post-larval seedlings of *Marsupenaeus japonicus* according to 1200 seedlings/mu;
(7) harvest *Stichopus japonicus, Marsupenaeus japonicus, Portunus trituberculatus* and *Ulva lactuca* from November 5 to 10 and send to the markets.

After putting the *Stichopus japonicus* seedlings, the prawn compound feed is fed every evening and early morning. Specifically, the feed is sprinkled on the bait platform set around the pond, and the amount of feed is based on standard of slight surplus on the bait platform before each feeding.

*Ulva lactuca* is harvested from June 15 to November 15, with a total of 6 times.

The conditions for the production of *Stichopus japonicus-Marsupenaeus japonicus-Portunus trituberculatus-Ulva lactuca* in 60 mu of ponds are shown in Table 3. The annual income of the pond is calculated according to the market price of the corresponding species.

EXAMPLE 3

A polyculture of *Stichopus japonicus-Marsupenaeus japonicus-Portunus trituberculatus-Ulva lactuca*, The aquaculture area of the pond is 60 mu. The steps are as follows:

(1) prepare a pond and laying a substratum for *Stichopus japonicus* from March 1 to 5;
(2) put the *Stichopus japonicus* seedlings with a size of 800/kg and a density of 4,000/mu and on April 1, feed them normally;
(3) After stocking *Stichopus japonicus* seedlings, set up net curtains, wherein each curtain is 20 m², and the fresh weight density of each net curtain is 2.0 kg/m², and for *Ulva lactuca* seedlings with a length of 1 cm, 8 net curtains are set up per mu of water;
(4) put p10 post-larval seedlings of *Marsupenaeus japonicus* according to 1000 seedlings/mu on April 15;
(5) put stage II *Portunus trituberculatus* juveniles according to 200 crabs per mu on May 5;
(6) harvest *Marsupenaeus japonicus* and send to the markets On July 15, and put second p10 post-larval seedlings of *Marsupenaeus japonicus* according to 1000 seedlings/mu;
(7) harvest *Stichopus japonicus, Marsupenaeus japonicus, Portunus trituberculatus* and *Ulva lactuca* from November 5 to 10 and send to the markets.

After putting the *Stichopus japonicus* seedlings, the prawn compound feed is fed every evening and early morning. Specifically, the feed is sprinkled on the bait platform set around the pond, and the amount of feed is based on standard of slight surplus on the bait platform before each feeding.

*Ulva lactuca* is harvested from June 15 to November 15, with a total of 6 times.

The conditions for the production of *Stichopus japonicus-Marsupenaeus japonicus-Portunus trituberculatus-Ulva lactuca* in 60 mu of ponds are shown in Table 3. The annual income of the pond is calculated according to the market price of the corresponding species.

COMPARATIVE EXAMPLE 1

A culture method of *Stichopus japonicus*, the culture area of the pond is 60 mu, including the following steps:
(1) prepare a pond and laying a substratum for *Stichopus japonicus* from March 1 to 5;
(2) put the *Stichopus japonicus* seedlings with a size of 500/kg and a density of 6,000/mu and on April 1, feed them normally;

(3) harvest *Stichopus japonicus* and send to the markets.

After putting the *Stichopus japonicus* seedlings, the prawn compound feed is fed every evening and early morning. Specifically, the feed is sprinkled on the bait platform set around the pond, and the amount of feed is based on standard of slight surplus on the bait platform before each feeding.

COMPARATIVE EXAMPLE 2

The steps are the same as Example 2, and the difference are as follows: in the step (4), p10 post-larval seedlings of *Marsupenaeus japonicus* is replaced to p10 post-larval seedlings of *Penaeus monodon*; in the step (6), harvest *Marsupenaeus japonicus* and put second p10 post-larval seedlings; but for the *Penaeus monodon*, this step is omitted.

COMPARATIVE EXAMPLE 3

The steps are the same as Example 2, and the difference are as follows: in the step (3): *Ulva lactuca* seedlings is replaced to *Asparagus schoberioides* seedlings.

COMPARATIVE EXAMPLE 4

A polyculture of *Stichopus japonicus-Marsupenaeus japonicus-Portunus trituberculatus-Ulva lactuca* is carried out. The aquaculture area of the pond is 60 mu. The steps are as follows:
(1) prepare a pond and laying a substratum for *Stichopus japonicus* from March 1 to 5;
(2) put the *Stichopus japonicus* seedlings with a size of 500/kg and a density of 6,000/mu and on April 1, feed them normally;
(3) After stocking *Stichopus japonicus* seedlings, set up net curtains, wherein each curtain is 24 m$^2$, and the fresh weight density of each net curtain is 0.3 kg/m$^2$, and for *Ulva lactuca* seedlings with a length of 1 cm, 10 net curtains are set up per mu of water;
(4) put p10 post-larval seedlings of *Marsupenaeus japonicus* according to 1200 seedlings/mu on April 15;
(5) harvest *Marsupenaeus japonicus* and send to the markets On July 15, and put second p10 post-larval seedlings of *Marsupenaeus japonicus* according to 1200 seedlings/mu;
(7) harvest *Stichopus japonicus, Marsupenaeus japonicus, Portunus trituberculatus* and *Ulva lactuca* from November 5 to 10 and send to the markets.

After putting the *Stichopus japonicus* seedlings, the prawn compound feed is fed every evening and early morning. Specifically, the feed is sprinkled on the bait platform set around the pond, and the amount of feed is based on standard of slight surplus on the bait platform before each feeding.

*Ulva lactuca* is harvested from June 15 to November 15, with a total of 6 times.

The conditions for the production of *Stichopus japonicus-Marsupenaeus japonicus-Ulva lactuca* in 60 mu of ponds are shown in Table 3. The annual income of the pond is calculated according to the market price of the corresponding species.

COMPARATIVE EXAMPLE 5

A polyculture of *Stichopus japonicus-Marsupenaeus japonicus-Portunus trituberculatus-Ulva lactuca* is carried out. The aquaculture area of the pond is 60 mu. The steps are as follows:
(1) prepare a pond and laying a substratum for *Stichopus japonicus* from March 1 to 5;
(2) put the *Stichopus japonicus* seedlings with a size of 500/kg and a density of 6,000/mu and on April 1, feed them normally;
(3) After stocking *Stichopus japonicus* seedlings, set up net curtains, wherein each curtain is 24 m$^2$, and the fresh weight density of each net curtain is 0.3 kg/m$^2$, and for *Ulva lactuca* seedlings with a length of 1 cm, 10 net curtains are set up per mu of water;
(4) put stage II *Portunus trituberculatus* juveniles according to 150 crabs per mu on May 5;
(5) harvest *Stichopus japonicuss, Portunus trituberculatus* and *Ulva lactuca* from November 5 to 10 and send to the markets.

After putting the *Stichopus japonicus* seedlings, the prawn compound feed is fed every evening and early morning. Specifically, the feed is sprinkled on the bait platform set around the pond, and the amount of feed is based on standard of slight surplus on the bait platform before each feeding.

*Ulva lactuca* is harvested from June 15 to November 15, with a total of 6 times.

The conditions for the production of *Stichopus japonicus-Portunus trituberculatus-Ulva lactuca* in 60 mu of ponds are shown in Table 3. The annual income of the pond is calculated according to the market price of the corresponding species.

The outputs of *Stichopus japonicus, Marsupenaeus japonicus (Penaeus monodon), Portunus trituberculatus* and *Ulva lactuca (Asparagus schoberioides)* in Examples 2 and 3 and Comparative Examples 1 to 5 are shown in Table 3. The water quality test results are shown in Table 4.

TABLE 3

Outputs and benefits of polyculture and monoculture of sea cucumbers

| | Variety | | | |
| --- | --- | --- | --- | --- |
| Item | *Stichopus japonicus* | *Marsupenaeus japonicus* (*Penaeus monodon*) | *Portunus trituberculatus* | *Ulva lactuca* (*Asparagus schoberioides*) |
| Output of Example 2 (kg) | 5040 | 2180 | 984 | 15000 |
| Benefits of a single variety in Example 2 (ten thousand yuan) | 46.62 | 10.53 | 5.67 | 4.20 |
| Total comprehensive benefits in Example 2 (ten thousand yuan) | | | 67.02 | |

TABLE 3-continued

Outputs and benefits of polyculture and monoculture of sea cucumbers

| | Variety | | | |
|---|---|---|---|---|
| Item | Stichopus japonicus | Marsupenaeus japonicus (Penaeus monodon) | Portunus trituberculatus | Ulva lactuca (Asparagus schoberioides) |
| Output of Example 3 (kg) | 4896 | 2040 | 1021 | 14060 |
| Benefits of a single variety in Example 3 (ten thousand yuan) | 45.34 | 9.85 | 5.83 | 3.94 |
| Total comprehensive benefits in Example 3 (ten thousand yuan) | | | 64.96 | |
| Output of Comparative Example 1 (kg) | 4800 | — | — | — |
| Comparative Example 1 Benefits (ten thousand yuan) | | | 42.86 | |
| Output of Comparative Example 2 (kg) | 4328 | 960 | 868 | 13260 |
| Benefits of a single variety in Comparative Example 2 (ten thousand yuan) | 40.03 | 6.32 | 5.00 | 3.71 |
| Total comprehensive benefits in Comparative Example 2 (ten thousand yuan) | | | 55.06 | |
| Output of Comparative Example 3 (kg) | 4682 | 1748 | 926 | 12480 |
| Benefits of a single variety in Comparative Example 3 (ten thousand yuan) | 43.31 | 8.44 | 5.33 | 3.49 |
| Total comprehensive benefits in Comparative Example 3 (ten thousand yuan) | | | 60.57 | |
| Output of Comparative Example 4 (kg) | 4560 | 1857 | — | 13584 |
| Benefits of a single variety in Comparative Example 4 (ten thousand yuan) | 42.18 | 8.97 | — | 3.81 |
| Total comprehensive benefits in Comparative Example 4 (ten thousand yuan) | | | 54.96 | |
| Output of Comparative Example 5 (kg) | 4562 | — | 912 | 11380 |
| Benefits of a single variety in Comparative Example 5 (ten thousand yuan) | 42.20 | — | 5.26 | 3.19 |
| Total comprehensive benefits in Comparative Example 5 (ten thousand yuan) | | | 50.65 | |

The production of *Stichopus japonicus, Marsupenaeus japonicus* (*Penaeus monodon*), *Portunus trituberculatus* and *Ulva lactuca* (*Asparagus schoberioides*) in 60 mu of ponds is shown in the table above. Polyculture of *Stichopus japonicus, Marsupenaeus japonicus, Portunus trituberculatus*, and *Ulva lactuca* has achieved the best results. The annual income of ponds is 670, 200 yuan calculated at the corresponding market price, which is more than 50% higher than the net income of single culture of *Stichopus japonicus*, and has an increase of 6,683 yuan per mu. Polyculture of shrimp and crab does not affect the growth of *Stichopus japonicus*, and moreover, the integrated culture mode of *Stichopus japonicus* slightly increases the output of monoculture of *Stichopus japonicus*. Although the unit output of *Marsupenaeus japonicus* and *Portunus trituberculatus* is not high, they are large in size and sold at a high price, so the income is obvious. Based on the 3 million mu of *Stichopus japonicus* aquaculture ponds across the country, the increase in revenue will reach 20 billion yuan.

TABLE 4

Water quality indicators of each culture mode

| Group | Maximum water temperature (° C.) | pH | COD (mg/L) | Transparency (m) | Inorganic nitrogen (mg/L) | Active phosphate (mg/L) | Sulfide (mg/L) |
|---|---|---|---|---|---|---|---|
| Example 2 | 31.8 | 8.2 ± 0.4 | 6.5 ± 0.6 | 2.3 ± 0.4 | 0.859 | 0.025 | 0.745 |
| Example 3 | 32.1 | 8.3 ± 0.4 | 6.5 ± 0.6 | 2.2 ± 0.4 | 0.783 | 0.035 | 0.785 |

TABLE 4-continued

Water quality indicators of each culture mode

| Group | Maximum water temperature (° C.) | pH | COD (mg/L) | Transparency (m) | Inorganic nitrogen (mg/L) | Active phosphate (mg/L) | Sulfide (mg/L) |
|---|---|---|---|---|---|---|---|
| Comparative Example 1 | 33.2 | 8.3 ± 0.6 | 5.0 ± 0.4 | 1.7 ± 0.3 | 1.037 | 0.068 | 1.136 |
| Comparative Example 2 | 32.6 | 8.1 ± 0.5 | 5.4 ± 0.4 | 1.9 ± 0.3 | 1.024 | 0.054 | 0.982 |
| Comparative Example 3 | 32.8 | 8.3 ± 0.6 | 5.2 ± 0.4 | 1.8 ± 0.2 | 1.037 | 0.046 | 0.931 |
| Comparative Example 4 | 32.7 | 8.1 ± 0.6 | 5.3 ± 0.3 | 1.9 ± 0.3 | 0.987 | 0.048 | 1.036 |
| Comparative Example 5 | 32.8 | 8.2 ± 0.6 | 5.3 ± 0.4 | 1.9 ± 0.2 | 0.979 | 0.051 | 0.954 |

No drugs are used during the entire culture process. *Marsupenaeus japonicus* and *Portunus trituberculatus* can eat natural baits that are considered to be the predator of *Stichopus japonicus*, and exert a good biological control function. As shown in Table 4, compared with the *Stichopus japonicus* monoculture ponds, the maximum water temperature of the integrated aquaculture ponds of *Stichopus japonicus, Marsupenaeus japonicus, Portunus trituberculatus* and *Ulva lactuca* is significantly lower than that of monoculture ponds, so that *Stichopus japonicus* can spend the summer safely. The seawater pH of integrated aquaculture ponds of *Stichopus japonicus, Marsupenaeus japonicus, Portunus trituberculatus* and *Ulva lactuca* is more stable than that of monoculture ponds, and the COD content and transparency are significantly increased, and the inorganic nitrogen, active phosphate and sulfide content of the seawater is significantly reduced, the discharges of nitrogen, phosphorus and sulfides are reduced by more than 30% compared to monoculture ponds, and the water quality indicators have reached the class II water discharge standards for marine aquaculture. It indicates that *Ulva lactuca* has played an important role in the integrated aquaculture in ponds and achieved a good ecological prevention and control effect.

What is claimed is:

1. A method of culturing *Stichopus japonicus, Marsupenaeus japonicus, Portunus trituberculatus* and *Ulva lactuca*, comprising the following steps:
   (1) preparing a pond and laying a substratum for *Stichopus japonicus* from March 1 to 5;
   (2) putting *Stichopus japonicus* seedlings, and then culturing *Ulva lactuca* seedlings on April 1, wherein the *Stichopus japonicus* seedlings are stocked at 4000 to 6000/mu, and are at a size range of 500 to 800/kg, and the *Ulva lactuca* seedlings are cultured at 0.3 to 2.0 kg/m$^3$;
   (3) putting *Marsupenaeus japonicus* seedlings on April 15, wherein the *Marsupenaeus japonicus* seedlings are stocked at 1000 to 1200 seedlings/mu, and all of the *Marsupenaeus japonicus* seedlings are p10 post-larval seedlings;
   (4) putting *Portunus trituberculatus* juveniles on May 5, wherein the *Portunus trituberculatus* juveniles are stocked at 150-200 crabs/mu;
   (5) harvesting *Marsupenaeus japonicus* in on July 15, and putting *Marsupenaeus japonicus* seedlings again, wherein the *Marsupenaeus japonicus* seedlings are stocked at 1000 to 1200 seedlings/mu, and all of the *Marsupenaeus japonicus* seedlings are p10 post-larval seedlings; and
   (6) harvesting the *Stichopus japonicus, Marsupenaeus japonicus, Portunus trituberculatus* and *Ulva lactuca* from November 5 to 10.

2. The method of claim 1, wherein the *Portunus trituberculatus* juveniles are stage II juveniles.

3. The method of claim 1, wherein the *Ulva lactuca* seedlings in step (2) are cultured by raft culture.

4. The method of claim 3, wherein each net curtain of the raft culture is 20 to 24 m$^2$, 8-10 net curtains per mu of water, and 0.3 to 2.0 kg of *Ulva lactuca* seedlings are cultured on each net curtain.

\* \* \* \* \*